(No Model.) 2 Sheets—Sheet 1.

L. M. CRISSEY.
FERTILIZER DISTRIBUTER AND SEED PLANTER.

No. 576,076. Patented Jan. 26, 1897.

Witnesses.
Albert Popkins
W. H. Ruff

Inventor
Leroy M. Crissey
By Matthews &co
His Attorneys

THE NORRIS PETERS CO., PHOTO-LITHO., WASHINGTON, D. C.

(No Model.) 2 Sheets—Sheet 2.

L. M. CRISSEY.
FERTILIZER DISTRIBUTER AND SEED PLANTER.

No. 576,076. Patented Jan. 26, 1897.

Witnesses.
Albert Popkins
W. H. Ruff

Inventor
Leroy M. Crissey
By Matthews &co
His Attorneys

THE NORRIS PETERS CO., PHOTO-LITHO., WASHINGTON, D. C.

UNITED STATES PATENT OFFICE.

LEROY MERRILL CRISSEY, OF NEAR MARIETTA, GEORGIA, ASSIGNOR OF TWO-THIRDS TO WM. E. GILBERT AND ROBERT N. HOLLAND, OF MARIETTA, GEORGIA.

FERTILIZER-DISTRIBUTER AND SEED-PLANTER.

SPECIFICATION forming part of Letters Patent No. 576,076, dated January 26, 1897.

Application filed July 6, 1896. Serial No. 598,268. (No model.)

*To all whom it may concern:*

Be it known that I, LEROY MERRILL CRISSEY, a citizen of the United States of America, residing near Marietta, in the county of Cobb and State of Georgia, have invented a certain new and useful combination-machine specially adapted for distributing guano and other fertilizers, also for planting cotton-seed, corn, wheat, sugar-cane and sorghum seed, peas, and other seeds; and I do hereby declare the following to be a full, clear, and exact description of the invention, such as will enable others skilled in the art to which it appertains to make and use the same.

My invention relates to a combined fertilizer-distributer and seed-planter; and its object is to provide an improved construction of the same which shall possess superior advantages with respect to efficiency in use.

The invention consists in the novel construction and combination of parts hereinafter fully described and claimed.

Figure 1:
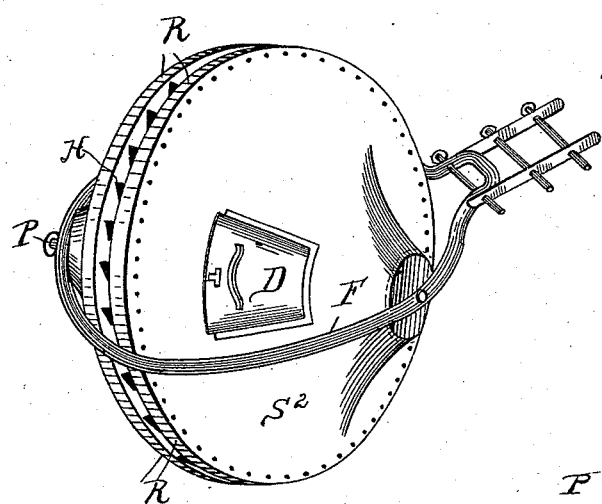
Figure 3:
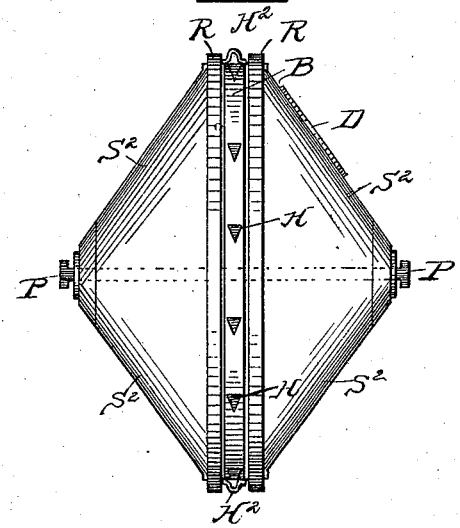
Figure 2:
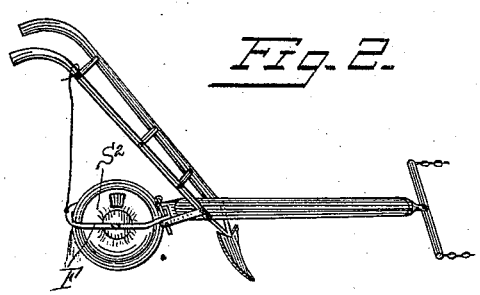
Figure 4:
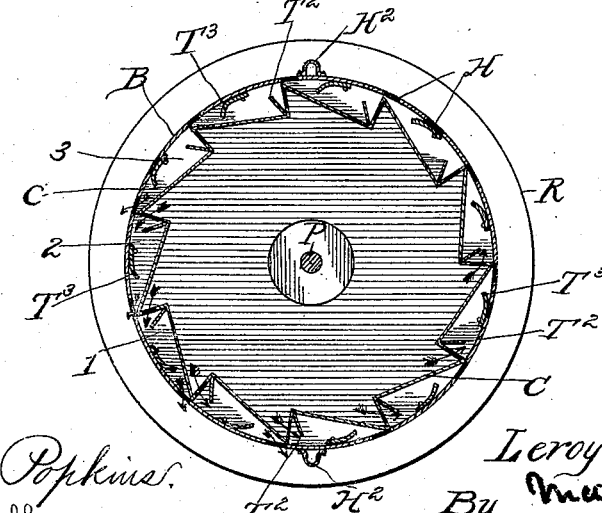
Figure 5:
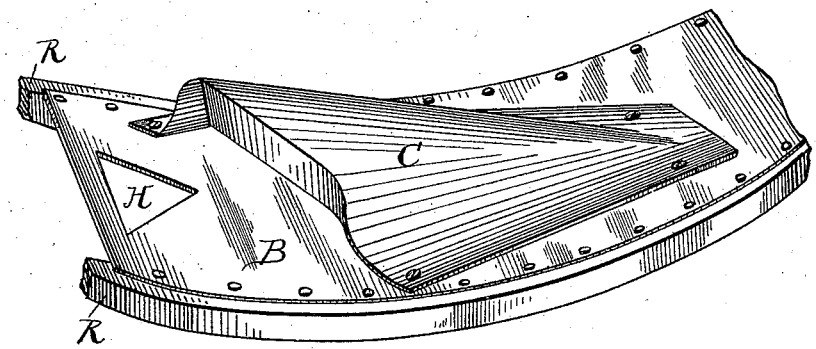
Figure 6:
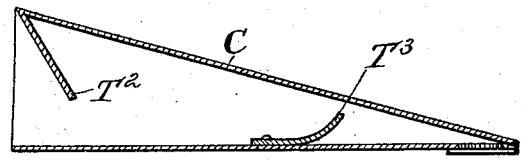
Figure 7:
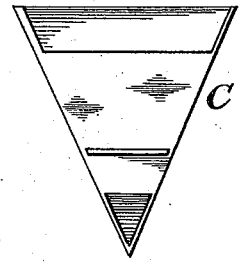
Figure 8:
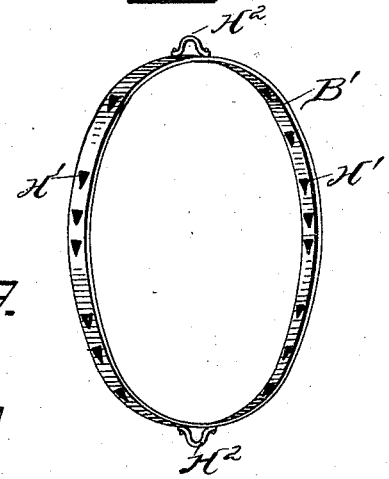
Figure 9:
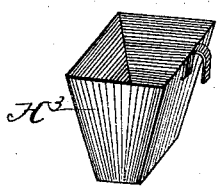

In the accompanying drawings, Figure 1 is a perspective view of the hopper. Fig. 2 is a perspective view, on a reduced scale, of a fertilizer-distributer and seed-planter constructed in accordance with my invention. Fig. 3 is an end view of the hopper. Fig. 4 is a longitudinal section of the same. Fig. 5 is a perspective view of one of the cups contained in the hopper. Fig. 6 is a transverse section of one of the cups. Fig. 7 is a top view of one of the same. Fig. 8 is a perspective view of the gage. Fig. 9 is a detail perspective view of the funnel.

In the said drawings, the reference-letters R R designate two wooden or metal rims parallel with each other with a space between them and joined together and held in position by a metal band B, which is securely fastened to the inner surface of each rim, which is concaved, as shown in Fig. 3. This band is provided with a number of triangular or other shaped holes H. (See Fig. 5.) Secured to said rim are two concavo-convex side pieces $S^2$, forming therewith a hopper for containing seed or fertilizing material. The hopper is mounted or turns upon an axle P, connected with the frame of the machine. One of said sides is provided with a door D for supplying the seed or fertilizing material to the hopper. The said inner surfaces of these rims and the inner surface of the band have secured thereto, by screws, nails, or rivets, a series of triangular-shaped cups C, the points or small ends of which are located just over the holes H. These cups are provided with a downwardly-extending curved tongue $T^2$ at the large end and with an oppositely-extending curved tongue $T^3$ near the small end, the object of which is to prevent too great a quantity of fertilizer or seed from escaping from the hopper. Fitting tightly upon said band is an annular ring B', formed with a number of holes H' and provided with two handles $H^2$, by which it may be turned to bring the holes therein in and out of coincidence with the holes in the band.

The letter F designates the frame, with which the hopper-axle is connected at its front end with a plow-beam and at the rear connected by a chain with the handles of the plow.

In Fig. 9 I have shown a funnel $H^3$ for filling the hopper when the door D is opened.

The rims R are somewhat greater in diameter than the band B, so that the band will not come in contact with the ground as it is moved over a field.

The operation is as follows: As the plow travels over a field the hopper will rotate and the seed or fertilizer will enter the large ends of the cups and fall successively to the tongues $T^2$ and $T^3$, and when the said cups reach the points marked 1, 2, and 3, Fig. 4, will escape through the holes in the band and ring into the furrows made by the plow. By turning the ring B' by means of its handles the area of the holes may be decreased or altogether closed, as desired, the said ring thus acting as a gage.

Having thus fully described my invention, what I claim is—

The combination with a plow, of the rotatable hopper comprising the rims, the band secured thereto, provided with a series of holes, the rotatable ring-gage fitting on said band provided with corresponding holes and with handles, and the triangular cups secured to said band, open at the large ends and closed at the small ends and said small ends located over the holes in the band and the oppositely-extending tongues located in said cups, substantially as described.

In testimony whereof I have affixed my signature in presence of two witnesses.

LEROY MERRILL CRISSEY.

Witnesses:
E. W. FREY,
G. M. FLEMING.